Figure 1:
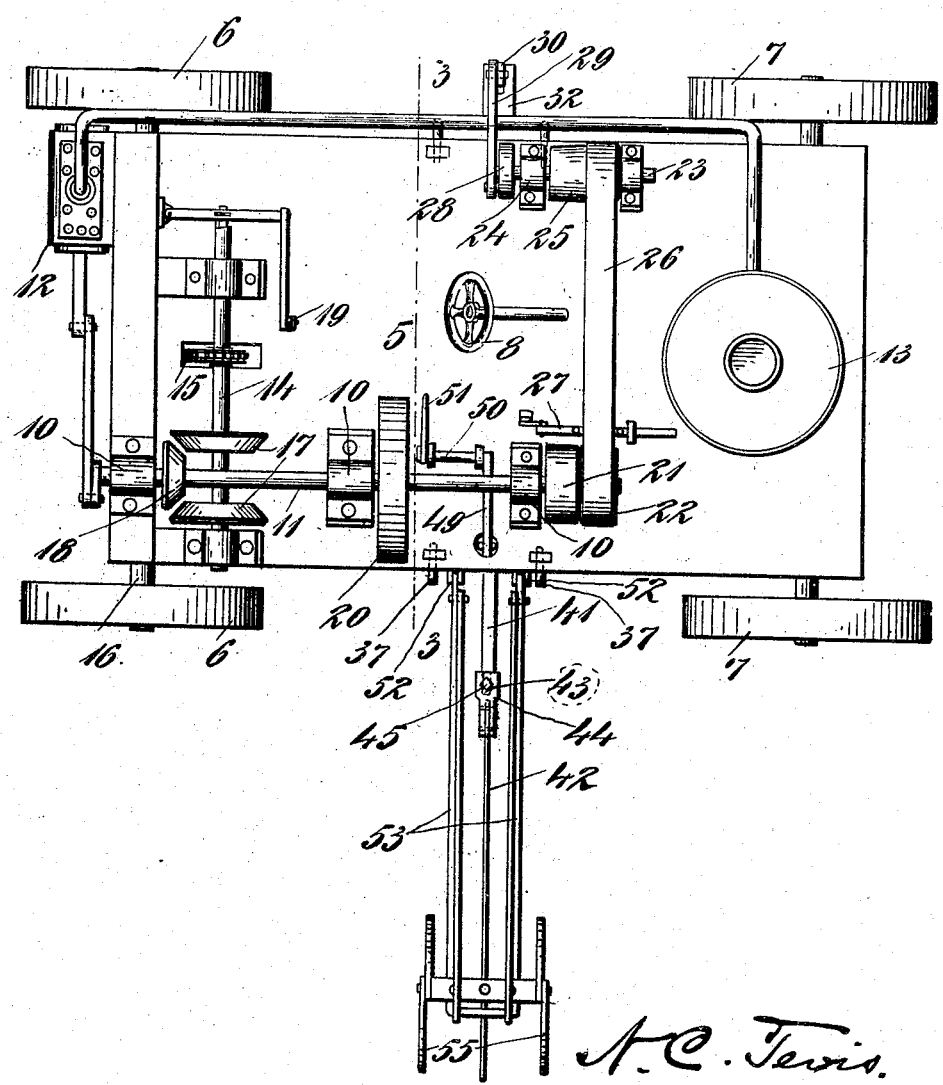

N. C. TEVIS.
PORTABLE SAWING MACHINE.
APPLICATION FILED MAR. 31, 1908.

915,808.

Patented Mar. 23, 1909.
3 SHEETS—SHEET 1.

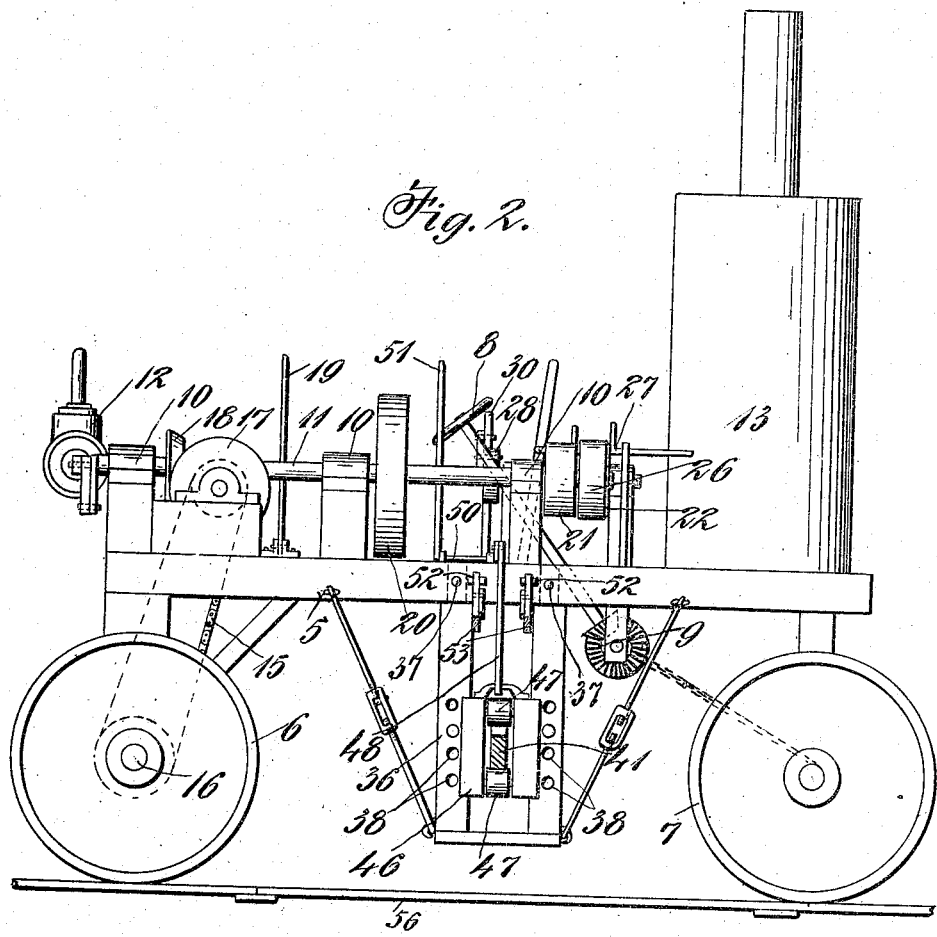

N. C. TEVIS.
PORTABLE SAWING MACHINE.
APPLICATION FILED MAR. 31, 1908.

915,808.

Patented Mar. 23, 1909.
3 SHEETS—SHEET 3.

UNITED STATES PATENT OFFICE.

NOAH CAP TEVIS, OF BEAUMONT, TEXAS.

PORTABLE SAWING-MACHINE.

No. 915,808.                Specification of Letters Patent.        Patented March 23, 1909.

Application filed March 31, 1908. Serial No. 424,444.

*To all whom it may concern:*

Be it known that I, NOAH C. TEVIS, a citizen of the United States, residing at Beaumont, in the county of Jefferson and State of Texas, have invented certain new and useful Improvements in Portable Sawing-Machines, of which the following is a specification.

This invention relates to portable sawing-machines, and has for its object to provide a machine which is mounted on wheels and in which the power for operating the saw is also employed for propelling the machine to and from the place of operation, and also along the log for taking a new cut.

A further object of the invention is to provide an improved saw operating-mechanism which can be disconnected from the machine so as not to impede the movement thereof when traveling over rough roads to or from the place of operation.

The invention also has for its object a novel construction and arrangement of parts as will be hereinafter described and claimed, whereby a machine is had which is simple in construction and efficient in operation.

In the accompanying drawing, Figure 1 is a plan view of the invention. Fig. 2 is a side elevation partly broken away. Fig. 3 is a transverse section on the line 3—3 of Fig. 1.

Referring specifically to the drawings, 5 denotes a platform which is mounted on wheels. The hind wheels 6 are the driving-wheels, and the front wheels 7 are the steering-wheels. On the platform is mounted a steering-wheel 8 which operates a suitable steering-gear 9.

Supported in suitable bearings 10 on the platform, is a main drive-shaft 11 to which motion is transmitted by an engine 12 mounted at the rear end of the platform. An upright steam boiler 13 for supplying steam to the engine is mounted on the platform at the front end thereof.

At 14 is indicated a counter-shaft which is mounted in suitable bearings on the platform and is connected by a sprocket and chain gearing 15 with the axle 16 of the drive-wheels 6. The counter-shaft is movable lengthwise in its bearings and is fitted with friction disks 17. On the main drive-shaft is a friction disk 18 with which either one of the first mentioned disks is adapted to be brought in contact in order that the machine may be driven forward or rearward. A hand-lever 19 pivoted to the platform is connected to the counter-shaft for operating the same to throw the friction disks into and out of gear as described. When the saw is being operated the disks 17 will both be disengaged from the disks 18 so that no motion will be transmitted to the counter-shaft and the machine will remain stationary.

On the main drive-shaft 11 is also mounted a fly-wheel 20, and loose and fast pulleys 21 and 22, respectively. On a counter-shaft 23 mounted in suitable bearings 24 on the platform is a pulley 25. These pulleys are connected by a belt 26 by means of which motion is imparted to the counter-shaft 23 from the main drive-shaft. A belt-shifter 27 is provided for shifting the belt from the fast to the loose pulley, and vice versa, to throw the counter-shaft into and out of gear.

On the counter-shaft 23 is a wrist-wheel 28 which is connected by a pitman 29 to one end of a lever 30 fulcrumed at 31 to a bracket 32 secured to and projecting from the platform. The other end of the lever is connected by a pitman 33 to a sliding cross-head 34 mounted on parallel guide-rods 35 carried by a bracket depending from the platform. This bracket comprises stems 36 which are inserted at their upper ends into holes through the platform, and are secured therein by transverse pins 37. The stems are suitably braced for strengthening the bracket.

In the stems 36 are a series of vertically spaced openings 38 in order that the guide-rods 35 may be adjusted vertically according to the size of the log, in order to lengthen or shorten the stroke of the saw. The connection between the lever 30 and the pitmen 29 and 33 is also an adjustable one by means of a series of holes 39 in the lever to receive the pins 40 connecting the same to the pitmen. The cross-head 34 is connected to the saw-beam 41 carrying at its front end the cross-cut saw 42. The connection between the saw-blade and the beam is such that the blade may be tilted or adjusted laterally to place it in proper position to make a straight cut if the machine happens to be standing on broken or hilly ground. For this purpose the end of the saw-beam is made round and fits in a socket 43 made in the saw-bail 44. The saw is held in adjusted position by means of a set screw 45.

Between the stems 36 on that side of the platform next to the saw is mounted a vertically sliding frame 46 carrying anti-friction rollers 47 between which the saw-beam 41 travels. The frame is connected by a rod 48 to an arm 49 projecting from a rock-shaft 50 mounted on the platform, and fitted with a hand-lever 51, whereby the frame may be raised or lowered to adjust the saw and also to feed it downward into the log.

To the side of the platform next to the saw is pivoted at 52 a pair of arms 53 carrying at their extremities a saw-guide 54. The latter carries log grabs or hooks 55. By pivoting the supporting-arms of the guide and grabs to the platform as described, they can be swung up out of the way when the machine is traveling to or from the place of operation, or when not in use.

In operation, when traveling to or from the place of operation as well as when shifting the machine on the log to make a new cut, the saw operating-mechanism is thrown out of gear by shifting the belt 26 to the loose pulley 21, and the gear 15 is operatively connected to the main drive-shaft 11 by the means heretofore described. Portable track sections 56 are preferably used when the machine is traveling. To operate the saw, the driving-gear 15 is disconnected, and the belt 26 is shifted to the fast pulley 22, the necessary adjustments of the saw operating means according to the size of the log, etc., being first made as heretofore described.

Upon removing the pins 40 as well as disconnecting the ends of the bracket braces which are connected to the platform, the bracket and the parts supported thereby can be removed from beneath the platform, and laid on top thereof which enables the machine to pass over obstructions without interference.

I claim:

1. A sawing-machine comprising a wheeled platform, a bracket thereunder having guides extending crosswise under the platform, a sliding cross-head mounted in said guides, a saw connected to one end of the cross-head at one side of the platform, a lever extending beside the other side of the platform and connected to the other end of the cross head, and means on the platform to operate the lever.

2. A sawing-machine comprising a wheeled platform, stems depending from the platform under opposite sides thereof, parallel horizontal guide rods carried by the stems and extending crosswise under the platform, a cross-head mounted on the guide-rods, a saw beam pivotally connected to one end of the cross head, a vertically sliding frame through which the front end of the saw beam works, and driving means connected to the other end of the cross head.

In testimony whereof I affix my signature in presence of two witnesses.

NOAH CAP TEVIS.

Witnesses:
W. A. JONES,
A. W. OLIVER.